(12) United States Patent
Thangadurai (10) Patent No.: US 6,748,526 B1
(45) Date of Patent: Jun. 8, 2004

(54) CPU STEPPING AND PROCESSOR FIRMWARE MATCHING MECHANISM

(75) Inventor: George Thangadurai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,347

(22) Filed: Dec. 29, 1999

(51) Int. Cl.[7] ................. G06F 15/177; G06R 9/00
(52) U.S. Cl. ................. 713/1; 713/2; 713/100
(58) Field of Search ................. 713/1, 2, 100; 717/170, 171, 172, 173

(56) References Cited

U.S. PATENT DOCUMENTS

| | | | |
|---|---|---|---|
| 5,822,692 A | * 10/1998 | Krishan et al. | 455/419 |
| 5,848,064 A | * 12/1998 | Cowan | 370/338 |
| 5,905,896 A | * 5/1999 | Delannoy | 717/170 |
| 6,188,948 B1 | * 2/2001 | Shivler, Jr. | 701/76 |
| 6,266,809 B1 | * 7/2001 | Craig et al. | 717/173 |
| 6,536,456 B2 | * 3/2003 | Dickerson et al. | 137/12 |

FOREIGN PATENT DOCUMENTS

JP 11003213 A * 1/1999 ............. G06F/9/06

OTHER PUBLICATIONS

IBM, Method for Selecting Firmware Architecture Level, Oct. 1, 1997, vol. 40, Issue 10, pp. 143–144.*

* cited by examiner

Primary Examiner—Thomas Lee
Assistant Examiner—Suresh K Suryawanshi
(74) Attorney, Agent, or Firm—Blakely, Sokoloff, Taylor & Zafman LLP (57) ABSTRACT

A method and an apparatus for validating a processor firmware ("PF") are disclosed. In one embodiment, at least one version of Processor Firmware ("PF") is identified. After identification, the PF is compared with a version of PF that is required by a processor, to determine whether the PF is compatible with the processor. If the version of PF is incompatible with the version of PF required by the processor, the current execution is suspended and a new version of PF is obtained. When the new version of PF is received, the system is initialized.

24 Claims, 6 Drawing Sheets

| | PF_A model 404 | PF_A release 406 | PF vendor 408 | | PF_B model 411 | PF_B release 412 |
|---|---|---|---|---|---|---|
| 402 | | | | 410 | | |
| Byte 6,7 | Byte 5 | Byte 4 | Byte 3 | Byte 2 | Byte 1 | Byte 0 |

CPU STEPPING AND PROCESSOR FIRMWARE MATCHING MECHANISM

BACKGROUND OF THE INVENTION

1. Field of the Invention

The present invention relates generally to the field of computer systems. More specifically, the present invention relates to the processor firmware.

2. Description of the Related Art

Performance goals of a processor increase in every generation, and progressively more sophisticated processor architectures are required to implement their complex functions. A typical processor performs various functions, which include performance critical as well as non-performance critical functions. A typical performance critical function, such as, for example, a multiply function, may be required to accomplish the function within a predefined time period. On the other hand, a non-performance critical function, such as, for example, a machine check handler, can be performed with no specific time limitations.

To enhance processor performance, a processor firmware ("PF") may be used to perform non-performance critical functions. By moving the non-performance critical functions to the PF, the processor can execute performance critical functions more expeditiously. Accordingly, using firmware can improve overall system performance.

Because of separation of the functionality between processor and firmware, it is important to have a correct version of PF to work with the processor. If an incompatible PF is used, the functionality of the processor cannot be guaranteed. Consequently, a system may fail if the processor fails.

SUMMARY OF THE INVENTION

At least one version of Processor Firmware ("PF") is identified. After identification, the PF is compared with a version of PF that is required by a processor, to determine whether the PF is compatible with the processor. If the version of PF is incompatible with the version of PF required by the processor, the current execution is suspended and a new version of PF is obtained. When the new version of PF is received, the system is initialized.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and an apparatus for validating a processor abstraction layer, also known as processor firmware, are described.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, et cetera.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying", et cetera, refers to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

OVERVIEW

A mechanism for validating a processor firmware ("PF") to work with a processor is described. After identifying a PF, a comparison between the version of the PF and a minimum required version of PF indicated by the processor is performed. The minimum required PF, in one embodiment, is a PF that is recent enough to work with the processor. If the PF is incompatible with the processor, a new version of PF will be obtained. For example, a version 3 PF is compatible with the processor where the processor requires either a version 1, version 2, or version 3 PF. However, a version 3 PF is not compatible with a processor if the processor requires a version 4 PF. It should be appreciated that version 1 PF is released earlier than version 2 PF, and version 2 PF is released earlier than version 3 PF, and so forth. All versions of PF are, in one embodiment, backward-compatible with all previous versions. For example, version 2 PF may contain all modifications of version 1 PF while version 3 PF may contain all modifications of version 1 and 2 PF.

If the version of PF is not current enough to meet the minimal requirement indicated by the processor, the processor suspends current execution and a new version of PF may be obtained. The processor restarts the validation steps after the new version of PF is received. However, if a compatible PF could not be found, a notice of incompatible PF is issued.

Figure 1:
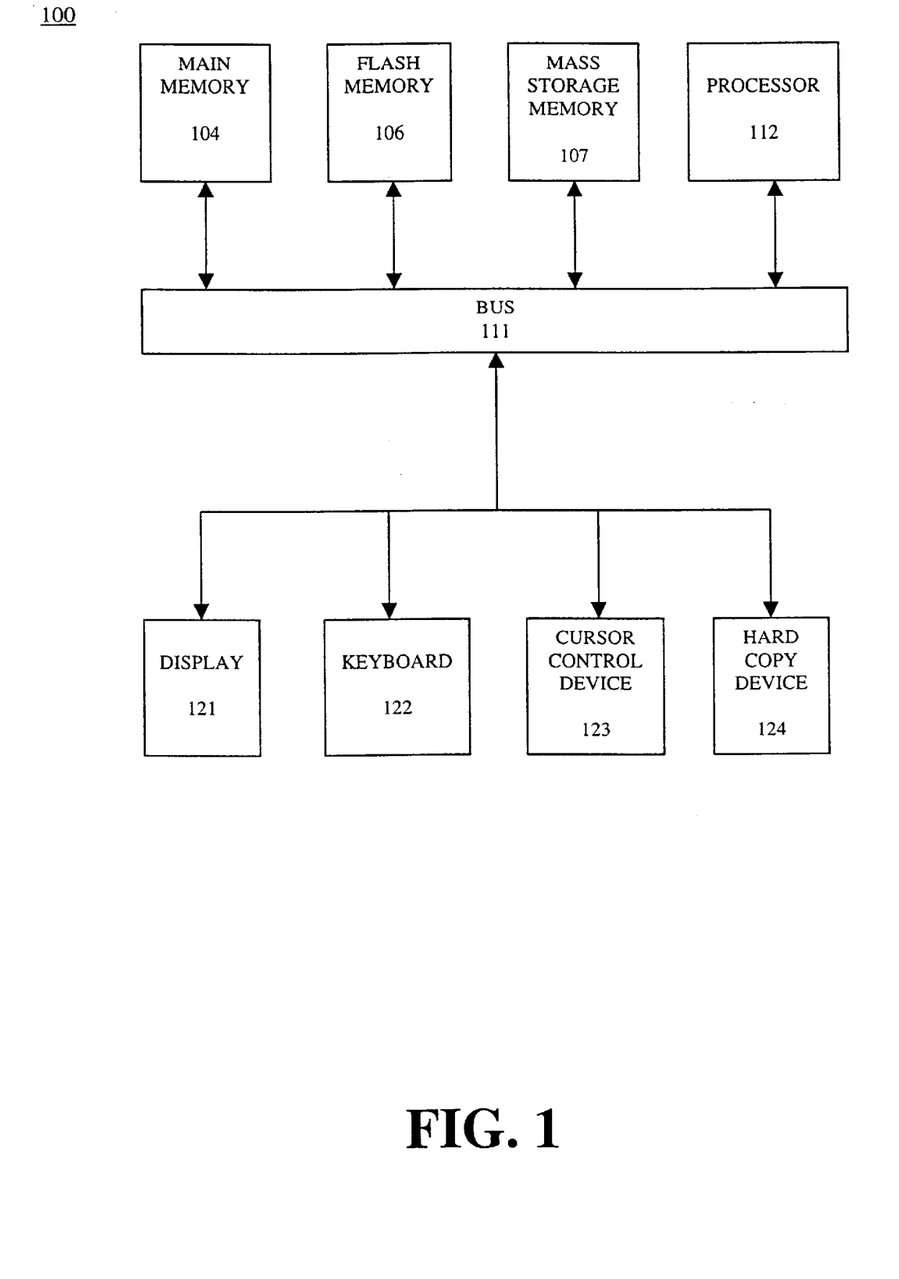
FIG. 1 is a block diagram illustrating one embodiment of a computer system.

Referring to FIG. 1, the computer system upon which an embodiment of the present invention is implemented is shown as 100. Computer system 100 comprises a bus or other communication means 111 for communicating information, and a processor 112 coupled with bus 111 for processing information. Processor 112 includes microprocessor, but not limited to a microprocessor, such as an Intel Architecture Microprocessor™, manufactured by Intel Corporation of Santa Clara, Calif., the corporate assignee of the present invention. Processor 112 may also be another processor such as the PowerPC™, Alpha™, et cetera.

System 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor 112. Computer system 100 also comprises a read only memory (ROM) and/or other static storage device 106 coupled to bus 111 for storing static information and instructions for processor 112, and a data storage device 107, such as a magnetic disk or optical disk and its corresponding disk drive. Data storage device 107 is coupled to bus 111 for storing information and instructions.

Computer system 100 may further be coupled to a display device 121, such as a cathode ray tube (CRT) or liquid crystal display (LCD), coupled to bus 111 for displaying information to a computer user. An alphanumeric input device 122, including alphanumeric and other keys, may also be coupled to bus 111 for communicating information and command selections to processor 112. An additional user input device is cursor control 123, such as a mouse, trackball, trackpad, stylus, or cursor direction keys, coupled to bus 111 for communicating direction information and command selections to processor 112, and for controlling cursor movement on display 121.

Another device which may be coupled to bus 111 is hard copy device 124, which may be used for printing instructions, data, or other information on a medium such as paper, film, or similar types of media. Furthermore, a sound recording and playback device, such as a speaker and/or microphone may optionally be coupled to bus 111 for audio interfacing with computer system 100. Note that any or all of the components of system 100 and associated hardware may be used in the present invention. However, it can be appreciated that other configurations of the computer system may include some or all of these devices.

Figure 2:
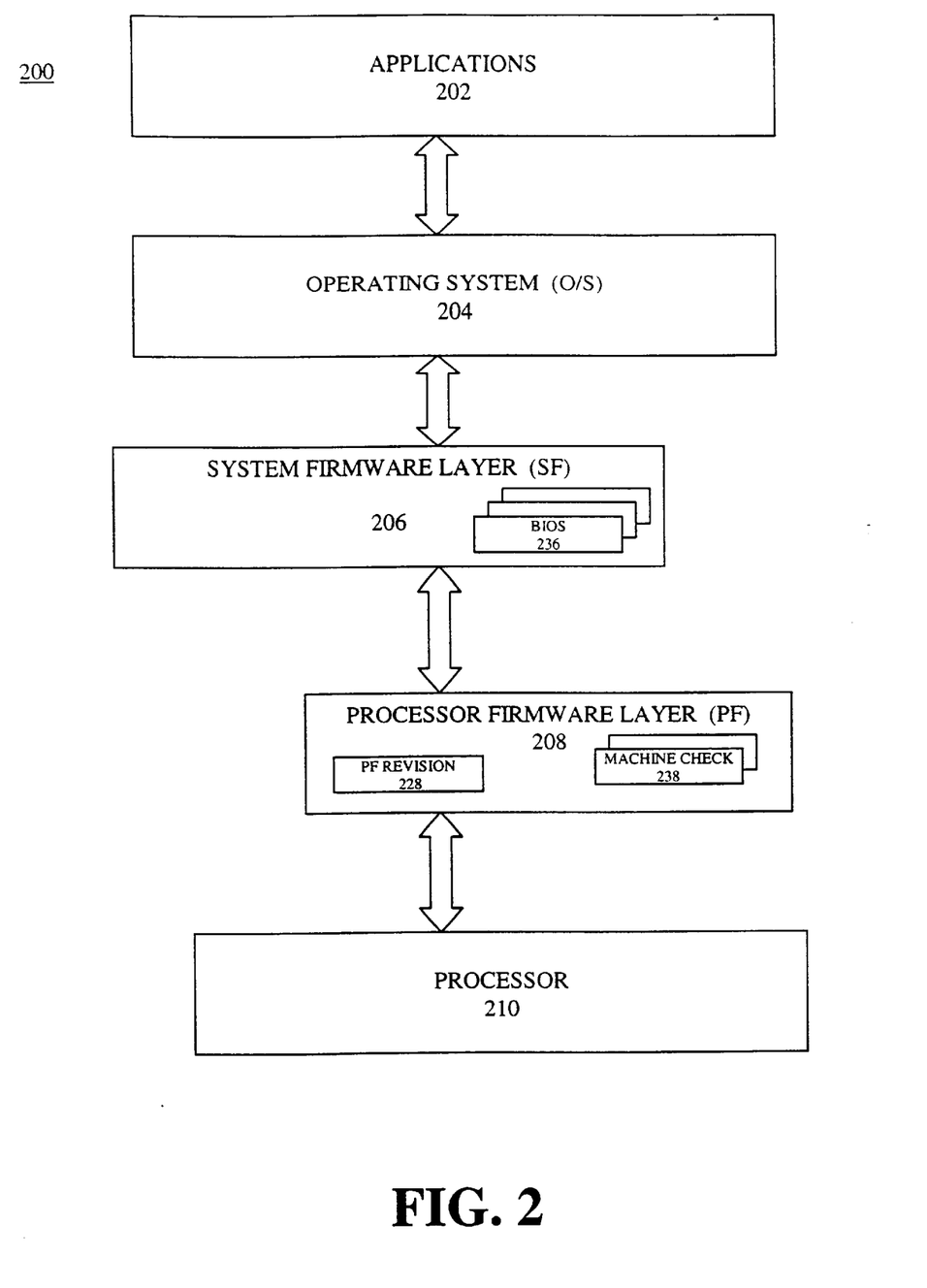
FIG. 2 illustrates one embodiment of a system configuration.

FIG. 2 illustrates one embodiment of computer architecture 200. Architecture 200 contains an application layer 202, an operating system ("O/S") 204, a system firmware layer ("SF") 206, a processor firmware layer ("PF") 208, and a processor layer 210. In one embodiment, PF 208 is also referred to as the process abstraction layer ("PAL"). Other layers or levels may be added, such as, for example, an assembly layer and a microcode layer.

Application layer 202, which is referred to herein as a problem-oriented language, includes high level languages used by application programmers or users to solve problems. High level languages, such as, for example, Ada, BASIC, C, C++, COBOL, PASCAL, may be included in application layer 202. Operating system 204, such as Windows, DOS, and UNIX, is used to support application layer 202 by coordinating the use of the hardware among the various application programs.

SF 206 is a layer that is situated between operating system 204 and PF 208 where SF 206 includes various control codes, such as a basic input-output system ("BIOS") 236 for facilitating system operations. For example, BIOS 236 controls the low-level resources of the computer systems. SF 206 is also known as a system firmware.

A specific version of the processor needs a specific version of PF before the processor can function properly. In other words, a current version of PF may be used with a current or earlier released processor. It is appreciated that a system may contain multiple processors and each processor may require different version of PF.

PF 208 is situated between SF 206 and processor layer (or hardware layer) 210. PF 208 is often considered a part of a processing unit and is responsible for executing non-critical processing functions, such as, for example, PF_revision 228 or machine check 238. In one embodiment, machine check 238 saves the architectural state in a non-cacheable area of the memory.

For example, when PF 208 is unable to handle the error, PF 208 collects the error information and, subsequently, passes the error information to SF 206. Once the error is recovered or fixed, the process returns to the location in the program immediately following the location at which the interrupt occurred. It should be appreciated that PF 208 may include other non-time critical functions.

Processor layer 210, which is also referred to herein as hardware layer, including execution devices, memory devices, decoders, et cetera, is the lowest level. Processor layer 210 may further contain a digital layer where various circuits are used to implement logic functions. The processor layer 210 might be further divided into other layers such as a gate layer and a semiconductor layer. It should also be appreciated that moving non-time critical functions from processor layer 210 to PF 208 enhances overall system performance.

Figure 3:
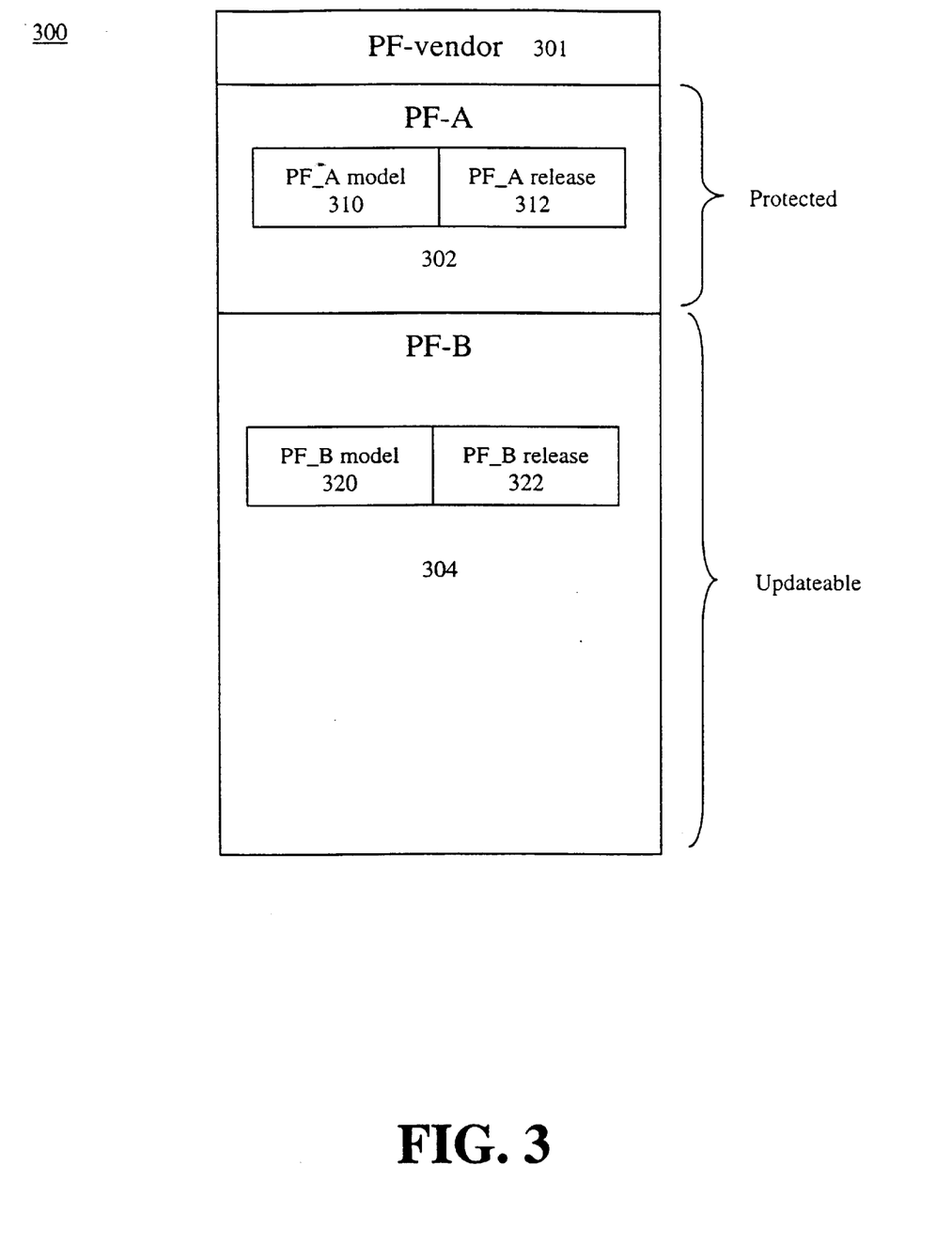
FIG. 3 is a block diagram illustrating one embodiment of a processor firmware layer.

FIG. 3 is a block diagram illustrating one embodiment of a processing abstraction layer, also known as PF 300. PF 300 is, in one embodiment, considered as part of a processing unit. While the processor is responsible to execute performance critical functions, PF 300 handles non-performance critical functions. Non-performance critical functions may include processor initialization, interruption handlers, and the like. In one embodiment, PF 300 is stored in read-only memory. It should be noted that additional components may be included in PF 300, but they are not necessary to understanding the invention.

In one embodiment, PF 300 is divided into a first and second portion. The first portion, which is write-protected, contains vendor 301 and PF_A 302 while the second portion, which is updateable, contains a PF_B 304. Since the first portion is write-protected, processor vendor 301 and PF_A 302 are not updateable. In one embodiment, vendor 301 contains vendor information, such as names of manufacturers.

In another embodiment, PF_A 302 contains PF_A model 310 and PF_A release 312. PF_A model 310 stores information relating to processor model (or version) or models. A processor, such as Pentium™ or PowerPC™ processor may contain multiple processor models or versions or releases. The term model, version, and release will be used interchangeably. For example, the clock speed of model one processor may be 300 MHz ("megahertz") while the clock speed of model two processor may be 400 MHz. Although model one and two processors may be the same processor, the internal implementations between the model one and two processors are different. Accordingly, model one and two processors may require different PF 300 to function correctly.

In one embodiment, PF_A release 312 contains information relating to a date that the PF is released, which indicates that the PF should be compatible with any processor that is released at or before the release date of PF. It is appreciated that newly released processors may contain new circuits. The new circuits may be used to fix bugs (or defects) found in the previously released processors. Thus, the newly released processor is slightly different from earlier released processor. Accordingly, a newly released processor may be required a new version PF to work correctly.

The second portion, which is updateable, includes PF_B 304, which further includes PF_B model 320 and PF_B release 322. In one embodiment, same information stored in PF_A model 310 and PF_A release 312 is also stored PF_B model 320 and PF_B release 322. The second portion may include other components, but they are not necessary to understanding the present invention.

It should be further appreciated that the PF 300 can be coded in a form of computer program that can be read from a computer readable storage medium.

Figure 4:
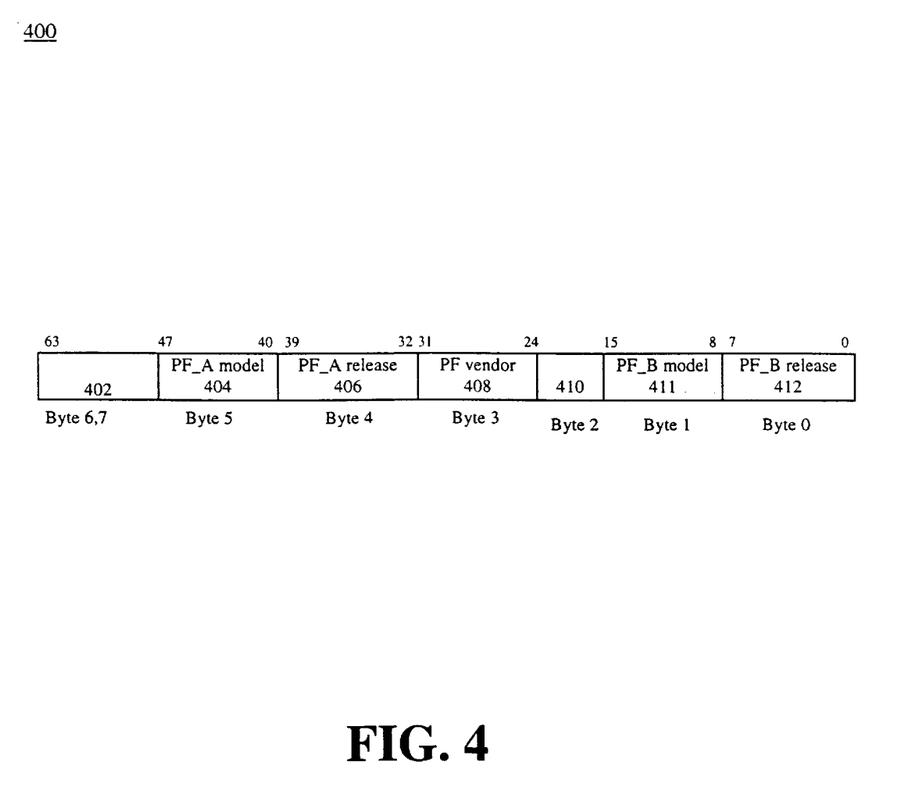
FIG. 4 is a block diagram illustrating one embodiment of a processor firmware register.

FIG. 4 is a block diagram illustrating one embodiment of PF register 400, which stores data indicating the version of PF required by the processor. In one embodiment, PF register 400 is configured to be a 64-bit wide register where PF register 400 may be divided into eight bytes. Byte 0, 1, 3, 4, 5 are used to store PF_B release 412, PF_B model 411, PF_vendor 408, PF_A release 406, and PF_A model 404, respectively.

During execution, the processor, in one embodiment, compares the version of PF with the version of PF indicated by PF register 400. The version of PF is compatible with the processor if the version of PF is at least as recent as the version of PF indicated by PF register 400. A new version of PF would be required if the version of PF is older than the version of PF indicated by PF register 400. As discussed previously, PF is, in one embodiment, backward-compatible. In other words, a later version of PF supports earlier version or versions of PF. PF register 400 may store other information, which is not discussed here because it is not pertinent to understanding the present invention.

Figure 5:
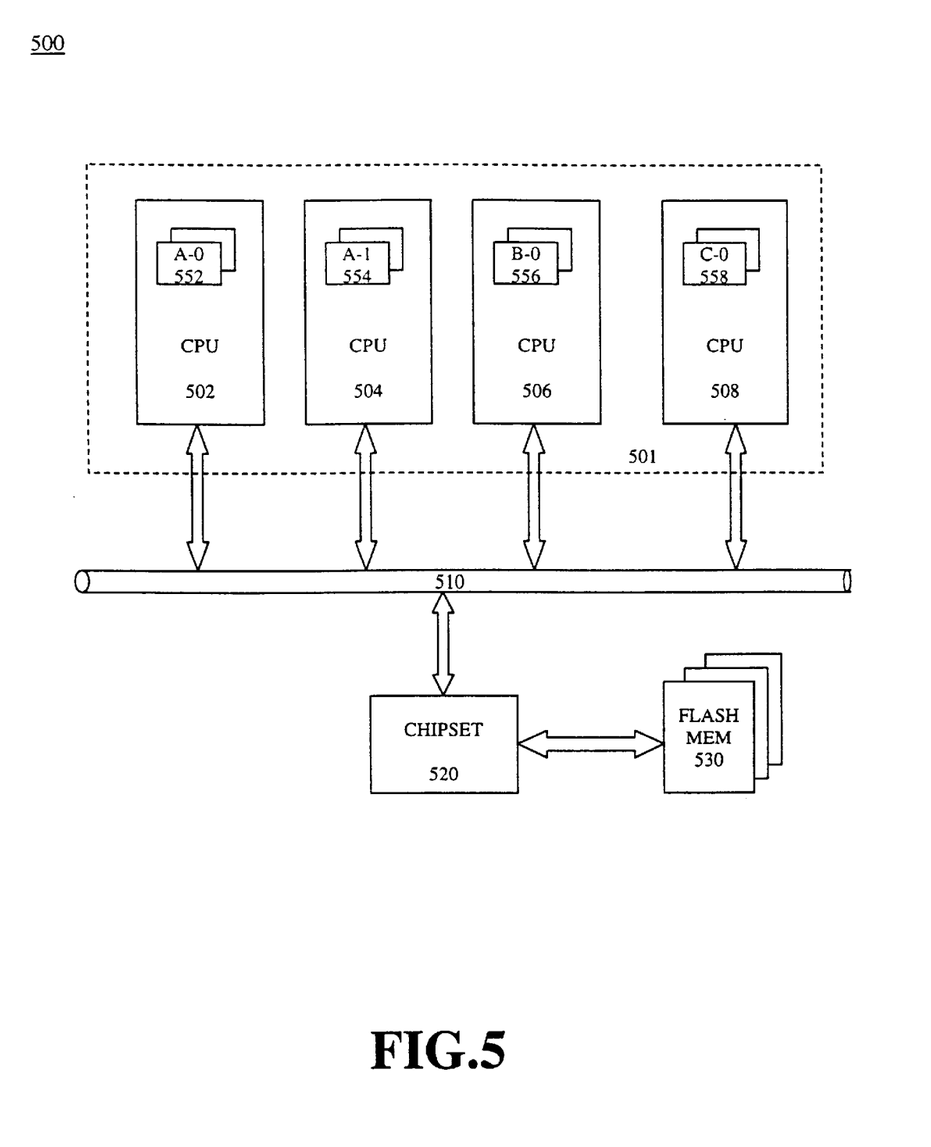
FIG. 5 is a block diagram illustrating one embodiment of a processor having multi-processing units.

FIG. 5 is a block diagram illustrating one embodiment of a multi-processing system 500. Multi-processing system 500 includes a processing unit 501, a bus 510, a chipset 520, and memory 530. In one embodiment, memory 530 includes multiple flash memories. Other components, such as clock and cache memory, may also be included in multi-processing system 500, but they are not included herein for the purposes of discussion.

In one embodiment, processing unit 501 is a parallel-processing device that contains CPUs ("Central Processing Unit") 502, 504, 506, and 508. In an alternative embodiment, CPUs 502, 504, 506, and 508 may require different version of PF because some CPUs are released earlier than others. Accordingly, each CPU may be a unique processor model.

Referring back to FIG. 5, CPU 502 is, in one embodiment, an A0 processor model and CPU 504 is an A1 processor model. Also, CPU 506 is a B0 model while CPU 508 is a C0 processor model. If the sequence of processor release is A0, A1, B0, and C0 processor models, a version of PF that is compatible with C0 processor model is also compatible with A0, A1, and B0 processor models. Likewise, if a version of PF is compatible with A1 processor model, it is not necessary to be compatible with B0 processor model.

Chipset 520 is a hub device that controls bus allocation. Bus allocation is a scheme that determines which component may use the bus 510. Memory 530 may be organized into multiple banks of memory where each bank uses a flash memory chip. The flash memory may be used to store at least one version of PF. Other components may be included in multi-processing system 500, but they are not necessary to understanding the invention.

During operation, a version of PF is, in one embodiment, compared with the versions of PF required by CPUs 502, 504, 506, and 508. In an alternative embodiment, the version of PF is compared with the latest processor model of CPU and if the version of PF is compatible with the latest processor model, the version of PF should also be compatible with other earlier processor models. For example, if a version of PF is compatible with C0 processor model of CPU 508, the version of PF should also be able to use with processor model A0, A1, and B0 of CPU 502, 504, and 506, respectively. However, if a version of PF fails to match with any one of the versions of PF indicated by CPU 502, 504, 506, and 508, the PF validating process is suspended and a new version of PF is obtained. Once a new version of PF is identified, the PF validating process is resumed or restarted.

Figure 6:
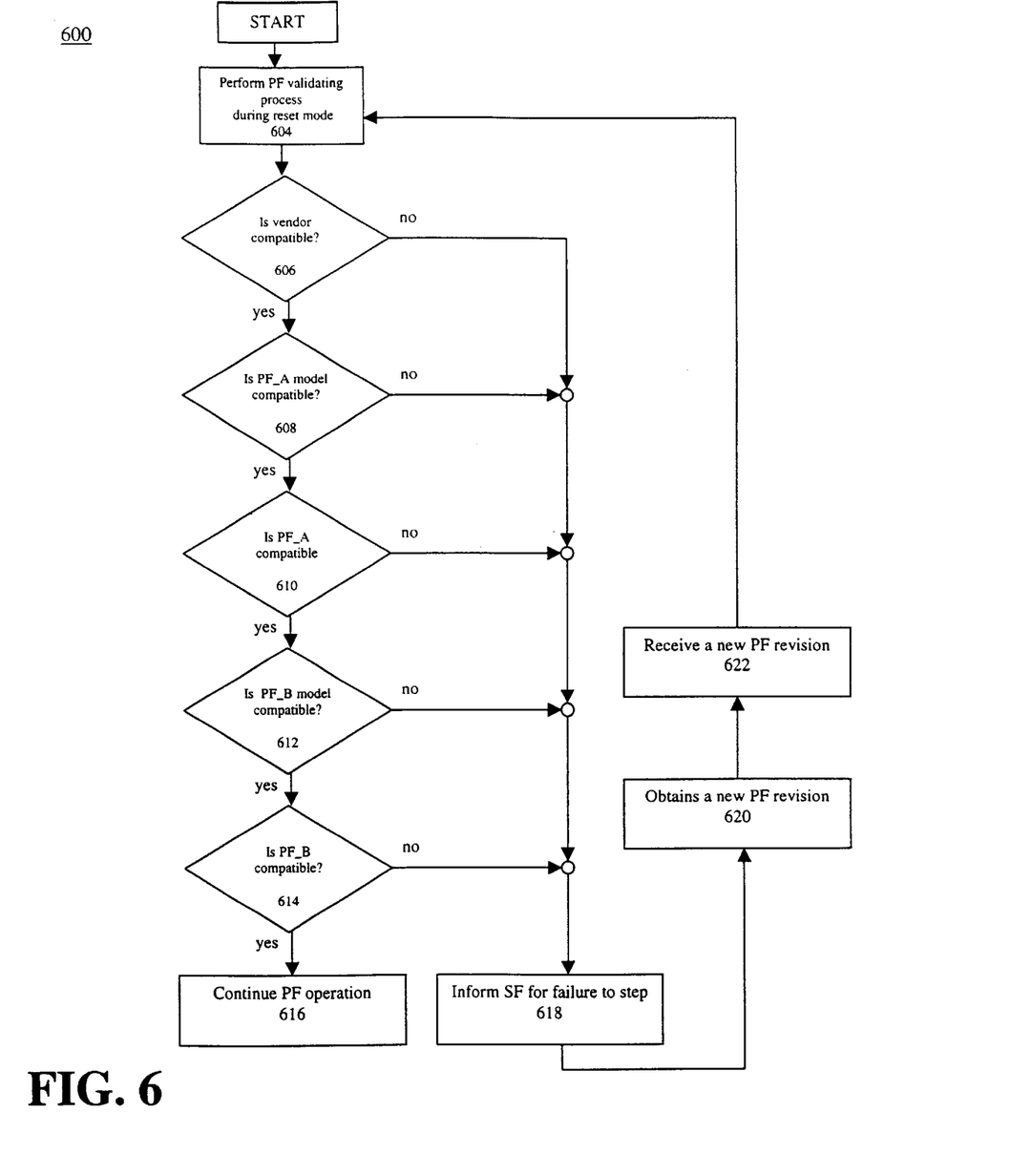
FIG. 6 is a flow chart illustrating one embodiment of a process for validating a processor firmware.

FIG. 6 is a flow chart 600 illustrating one embodiment of a processor firmware validation ("PFV") process for validating a PF. A process of PFV begins at start block and proceeds to block 604. At block 604, the system enters a reset mode. In one embodiment, a PFV is performed during a system reset. After block 604, the process proceeds to block 606 where the process examines whether the vendor matches with the vendor information stored in the CPU. If block 606 is false, which indicates that the vendor has failed to match, the process proceeds to block 618.

On the other hand, if block 606 is true, which indicates that the vendor has matched, the process proceeds to block 608 where the process examines whether the PF_A model is compatible with the PF_A model required by the CPU. If block 608 is false, which indicates that the PF_A model has failed to match, the process proceeds to block 618.

If block 608 is true, which indicates that the PF_A model is compatible with the model indicated by the CPU, the process proceeds to block 610. At block 610, the process examines whether the PF_A release is compatible with the PF_A release indicated by the CPU. If block 610 is false, which indicates that the PF_A release has failed to match, the process proceeds to block 618.

On the other hand, if block 610 is true, which indicates that the PF_A release is compatible with the PF_A release indicated by the CPU, the process proceeds to block 612. At block 612, the process examines whether the PF_B model matches with the PF_B model indicated by the CPU. If block 612 is false, which indicates that the PF_B model has failed to match, the process moves to block 618.

If block 612 is true, which indicates that the PF_B model is compatible with the PF_B model indicated by the CPU, the process moves to block 614. At block 614, the process examines whether the PF_B release is compatible with the PF_B release required by the CPU. If block 614 is false, which indicates that the PF_B release is not compatible with the PF_B release required by the CPU, the process proceeds to block 618. However, if block 614 is true, which indicates that the PF_B release is compatible, the process proceeds to block 616. At block 616, the process, in one embodiment, exists PFV process and continues to execute the remaining PF operations.

At block 618, the process, in one embodiment, informs SF or the system firmware, that the current version of PF is incompatible with the minimal version of PF required by the CPU. After block 618, the process proceeds to block 620 where the SF obtains a new version of PF. In one embodiment, SF fetches a new version of PF from a SF storage. In an alternative embodiment, SF obtains a new version of PF from a user or a network. At block 622, a new version of PF is received. After block 622, the process loops back to block 604 where the steps listed in block 604 are repeated.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims, which in themselves recited only those features regarded as essential to the invention.

Thus, a method and an apparatus for validating a processor firmware have been described.

What is claimed is:

1. A method for validating processor firmware ("PF") comprising:
    identifying at least one version of PF;
    identifying at least one version of PF required by at least one processor;
    comparing the version of PF with the version of PF required by the processor to determine whether the PF is compatible with the processor;
    suspending current execution when the PF is incompatible with the processor;
    obtaining a new version of PF; and
    initializing the system in response to the new version of PF.

2. The method of claim 1, further comprising issuing a notice of failure to find a compatible PF when a compatible version of PF is not found.

3. The method of claim 2, wherein the issuing of a notice further includes:
    creating the notice indicating no compatible version of PF has been found; and
    sending the notification to a system firmware layer.

4. The method of claim 1, wherein the identifying at least one version of PF required by at least one processor further includes identifying a minimum version of PF that the processor needs.

5. The method of claim 1, wherein the obtaining a new version of PF includes:
    identifying a new version of PF; and
    restarting a PF validating process in response to the new version of.

6. The method of claim 1, wherein the comparing the version of PF with the version of PF required by the processor further includes:
    identifying a vendor;
    identifying a vendor information specified by the CPU; and
    comparing the vendor with the vendor information.

7. The method of claim 1, wherein the comparing the version of PF with the version of PF required by the processor includes:
    identifying a PF_A model;
    identifying a minimal PF_A model required by the CPU; and
    comparing the PF_A model with the minimal PF_A model.

8. The method of claim 1, wherein the comparing the version of PF with the version of PF required by the processor includes:
    identifying a PF_A release;
    identifying a minimal PF_A release specified by the CPU; and
    comparing the PF_A release with the minimal PF_A release.

9. The method of claim 1, wherein the comparing the version of PF with the version of PF required by the processor includes:
    identifying a PF_B model;
    identifying a minimal PF_B model specified by the CPU; and
    comparing the PF_B model with the minimal PF_B.

10. The method of claim 1, wherein the comparing the version of PF with the version of PF required by the processor includes:
    identifying a PF_B release;
    identifying a minimal PF_B release required by the CPU; and
    comparing the PF_B release with the minimal PF_B release.

11. The method of claim 1, wherein the obtaining a new version of PF further includes:
    requesting a new version of PF from a user; and
    receiving the new version of PF.

12. The method of claim 1, wherein the obtaining a new version of PF further includes:
    requesting a new version of PF from a network; and
    receiving the new version of PF.

13. The method of claim 1, wherein the suspending current execution includes stopping the initialization process.

14. A processing system comprising:
    a processor;
    a memory, coupled to the processor, having stored therein a processor firmware ("PF") and a system firmware ("SF"), when executed by the processor, causes the processor to perform:
    identifying at least one version of PF;
    identifying at least one version of PF required by at least one processor;
    comparing the version of PF with the minimal version of PF required by the processor to determine whether the version of PF is compatible with the processor;
    suspending current execution when the version of PF is incompatible with the minimal version of PF required by the processor;
    obtaining a new version of PF;
    initializing the system in response to the new version of PF; and
    issuing a message of failure to find a compatible version of PF when a compatible version of PF is not found.

15. The processing system of claim 14, wherein the PF contains a PF_A and a PF_B, wherein the PF_A is the non-updateable portion of the PF, wherein the PF_B is the updateable portion of the PF.

16. The processing system of claim 15, wherein the PF_A contains information of PF_A model and PF_A release and PF vendor.

17. The processing system of claim 15, wherein the PF_B contains PF_B model and a PF_B release.

18. The processing system of claim 14, further comprising a PF register coupled to the processor, wherein the PF register stores a minimal version of PF required by the processor.

19. An article of manufacture for use in a digital processing system for storing a processor firmware ("PF") layer, the article of manufacture comprising a machine readable medium having machine readable program code embodied in the medium, the program code comprising:
  identifying at least one version of PF;
  identifying at least one version of PF required by at least one processor;
  comparing the version of PF with the minimal version of PF required by the processor to determine whether the version of PF is compatible with the processor;
  suspending current execution when the version of PF is incompatible with the minimal version of PF required by the processor;
  obtaining a new version of PF;
  initializing the system in response to the new version of PF; and
  issuing a notice of failure to find a compatible version of PF when a compatible version of PF is not found.

20. The article of manufacture of claim 19 wherein the issuing a notice further includes:
  creating a message indicating no compatible version of PF can be found; and
  sending the message to system firmware layer.

21. The article of manufacture of claim 19, wherein the obtaining a new version of PF includes identifying a new version of PF from a system firmware layer ("SF").

22. An apparatus for validating processor; firmware ("PF") comprising:
  means for identifying at least one version of PF;
  means for identifying at least one version of PF required by at least one processor;
  means for comparing the version of PF with the minimal version of PF required by the processor to determine whether the version of PF is compatible with the processor;
  means for suspending current execution when the version of PF is incompatible with the minimal version of PF required by the processor;
  means for obtaining a new version of PF;
  means for initializing the system in response to the new version of PF; and
  means for issuing a notification of failure to find a compatible version of PF when a compatible version of PF is not found.

23. The apparatus of claim 22, wherein the means for identifying a new version of PF includes means for identifying at least a version of PF in a system firmware layer.

24. The method of claim 22, wherein the means for identifying at least one version of PF required by at least one processor further includes means for identifying a minimum version of PF that the processor needs in a storage location within the processor.

* * * * *